United States Patent
Yon et al.

(10) Patent No.: US 7,174,101 B2
(45) Date of Patent: Feb. 6, 2007

(54) OPTICAL SWITCHING METHOD AND SYSTEM THEREFOR

(75) Inventors: Choi Jee Yon, Daejeon (KR); Yang Choong Reol, Daejeon (KR); Hong Hyun Ha, Daejeon (KR); Hae Geun Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 1003 days.

(21) Appl. No.: 10/152,227

(22) Filed: May 20, 2002

(65) Prior Publication Data
US 2003/0035421 A1    Feb. 20, 2003

(30) Foreign Application Priority Data
Aug. 14, 2001    (KR) .............................. 2001-49025

(51) Int. Cl.
*H04J 14/00*    (2006.01)
*H04L 12/28*    (2006.01)

(52) U.S. Cl. ............................ 398/51; 398/45; 398/46; 398/57; 370/389

(58) Field of Classification Search ................. 398/45, 398/50, 51, 54, 55, 56, 57, 49, 46; 370/389, 370/398, 422, 505
See application file for complete search history.

(56) References Cited

U.S. PATENT DOCUMENTS

| 5,018,130 | A | 5/1991 | Suzuki et al. |
| 5,091,905 | A | 2/1992 | Amada |
| 6,441,935 | B1* | 8/2002 | Araki et al. .................. 398/52 |
| 6,871,021 | B2* | 3/2005 | Graves et al. ................ 398/45 |

OTHER PUBLICATIONS

Electronic Letters, Mar. 1, 1990, vol. 26, No. 5, pp. 288-289.

* cited by examiner

*Primary Examiner*—M. R. Sedighian
(74) *Attorney, Agent, or Firm*—Blakely Sokoloff Taylor & Zafman

(57) ABSTRACT

A method capable of optical packet switching even in a case where physical optical data in an optical packet switch has not the shape of a packet but the shape of continuous data, and a system therefore are provided. The optical switching method includes the steps of (a) detecting input terminals into which an optical packet is input, of an optical switch and switching the optical packet to destination output terminals of the optical packet, and (b) when there are the input terminals into which the optical packet is not inputted in step (a), detecting other input terminals into which the optical packet, which direct an output terminal among the plurality of output terminals connected to the input terminals, is inputted, and searching a blank output terminal and switching dummy data from the input terminal to the blank output terminal. Data having the shape of all input optical packets and data having not the shape of a packet but another shape can be switched into output terminals without omission, and thus data output when input data have the shape of continuous data maintain the shape of the continuous data.

6 Claims, 6 Drawing Sheets

OPTICAL SWITCHING METHOD AND SYSTEM THEREFOR

BACKGROUND OF THE INVENTION

1. Field of the Invention

The present invention relates to a optical switching method of an optical packet switching equipment, and more particularly, to a method capable of optical packet switching even in a case where physical optical data in an optical packet switch has not the shape of a packet but the shape of continuous data, and a system therefor.

2. Description of the Related Art

As shown in FIG. 1, an optical packet switching equipment recognizes the header information of optical packets input into optical packet header recognizers 1011 and 1012 at each of input terminals, extracts information related to output terminals of corresponding optical packets and packet synchronization information from the header information of the optical packets, transmits the information to an optical packet switch controller 104. The optical packet switch controller 104 synthesizes the information from the optical packet header recognizers 1011 and 1012 at each of input terminals, gives commands to optical packet synchronizers 1021 and 1022, aligns input optical packets, gives commands to optical packet collision eliminators 1031 and 1032. In a case where there are optical packets to be output to the same output terminal, the optical packet switch controller 104 gives commands to optical packet collision eliminators 1031 and 1032, adjusts the optical packets so that the optical packets don't collide with one another by using a proper method, gives control commands to an optical switch 105 so that each of the optical packets is switched into a desired output terminal.

In general, as shown inn FIG. 2, a optical switching method of an optical packet switching equipment includes a method for setting up an optical path corresponding to only when there are optical packets. That is, in step 201, it is determined whether optical packets are inputted into input terminals of the optical packet switch. In step 202, when the optical packets are inputted into the input terminals of the optical packet switch, the optical packets are switched into destination output terminals of the optical packets during the lengths of the optical packets. In step 203, the optical packets are not switched to any output terminals of the optical packet switch when the optical packets are not inputted into the input terminals of the optical packet switch. The optical switch is simply controlled by the method but physical data inputted into the optical packet switch must have a packet shape, and when there are no optical packets, it is recognized that there are no optical signals themselves. That is, when there are no optical packets but optical signals, an optical path cannot be set up, and thus the shape of the optical signals cannot be maintained to output terminals.

Hereinafter, the above-mentioned conventional switching method will be lo describe with reference to FIG. 3. FIG. 3 illustrates examples of an optical switch, optical signals inputted into input terminals of the optical switch, and optical signals outputted to output terminals of the optical switch with time shown on the horizontal axis. Right oblique-lined packets among the optical signals at the input terminals direct a first output terminal, horizontal-lined packets direct a second output terminal, and left oblique-lined packets direct a third output terminal, and numbers in each packet represent the number of the input terminals. Blank data between the packets are arbitrary dummy data interposed between the packets and represent the number of the input terminals as figures. The optical signals at the output terminals illustrate the result in which only the optical packets among the optical signals at the input terminals are switched into the output terminals. Here, dummy data mean arbitrarily added data so as to make the optical signals including the optical packets as continuous signals, for example, signals '01010101 . . . in which '0' and '1' are repeatedly represented.

For this reason, in order to implement an optical packet switch by the conventional optical switching method of an optical switch, a burst mode optical transmitter-receiver for transmitting and receiving optical data having the shape of a packet is necessary. However, since a conventional burst mode optical transmitter-receiver at the speed of 155 Mbps is used commonly, it is very difficult to implement a high-speed burst mode optical transmitter-receiver required for an optical packet switch.

SUMMARY OF THE INVENTION

To solve the above problem, it is an objective of the present invention to provide a switching method for an optical switch in which optical signals having not the shape of a packet but the shape of continuous data as physical data in the optical switch can be used by using a conventional optical transmitter-receiver without a burst mode optical transmitter-receiver and a system therefore.

Accordingly, to achieve the above objective, according to one aspect of the present invention, there is provided a switching method for an optical switch. The method includes the steps of (a) detecting input terminals into which an optical packet is inputted, of an optical switch and switching the optical packet to destination output terminals of the optical packet, and (b) when there are the input terminals into which the optical packet is not inputted in step (a), detecting other input terminals into which the optical packet, which direct an output terminal among the plurality of output terminals connected to the input terminals, is inputted, and searching a blank output terminal and switching dummy data from the input terminal to the blank output terminal. The switched state of the input terminal is maintained when there are no other input terminals into which an optical packet, which direct an output terminal among the output terminals connected to the input terminals, is inputted, in step (b).

To achieve the above object, according to another aspect of the present invention, there is provided an optical switching system. The system includes an inputting portion for inputting optical signals into a plurality of input terminals, a switching information-generating portion for generating switching information in which when an optical signal input into an input terminal among the plurality of input terminals has the shape of an optical packet, the input data is switched to a destination output terminal of the optical packet according to information related to output terminals of the optical packet, and when the optical signal doesn't have the shape of the optical packet, a blank output terminal is searched and the input data is switched to the blank output terminal, and for providing the switching information to an optical packet switch controller, an optical packet switch controller for controlling an optical switch according to switching information transmitted from the switching information-generating portion, and an optical switch for switching input data of the inputting portion to output terminals according to a control signal of the optical packet switch controller.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, the present invention will be described in detail by describing preferred embodiments of the invention with reference to the accompanying drawings.

Figure 4:
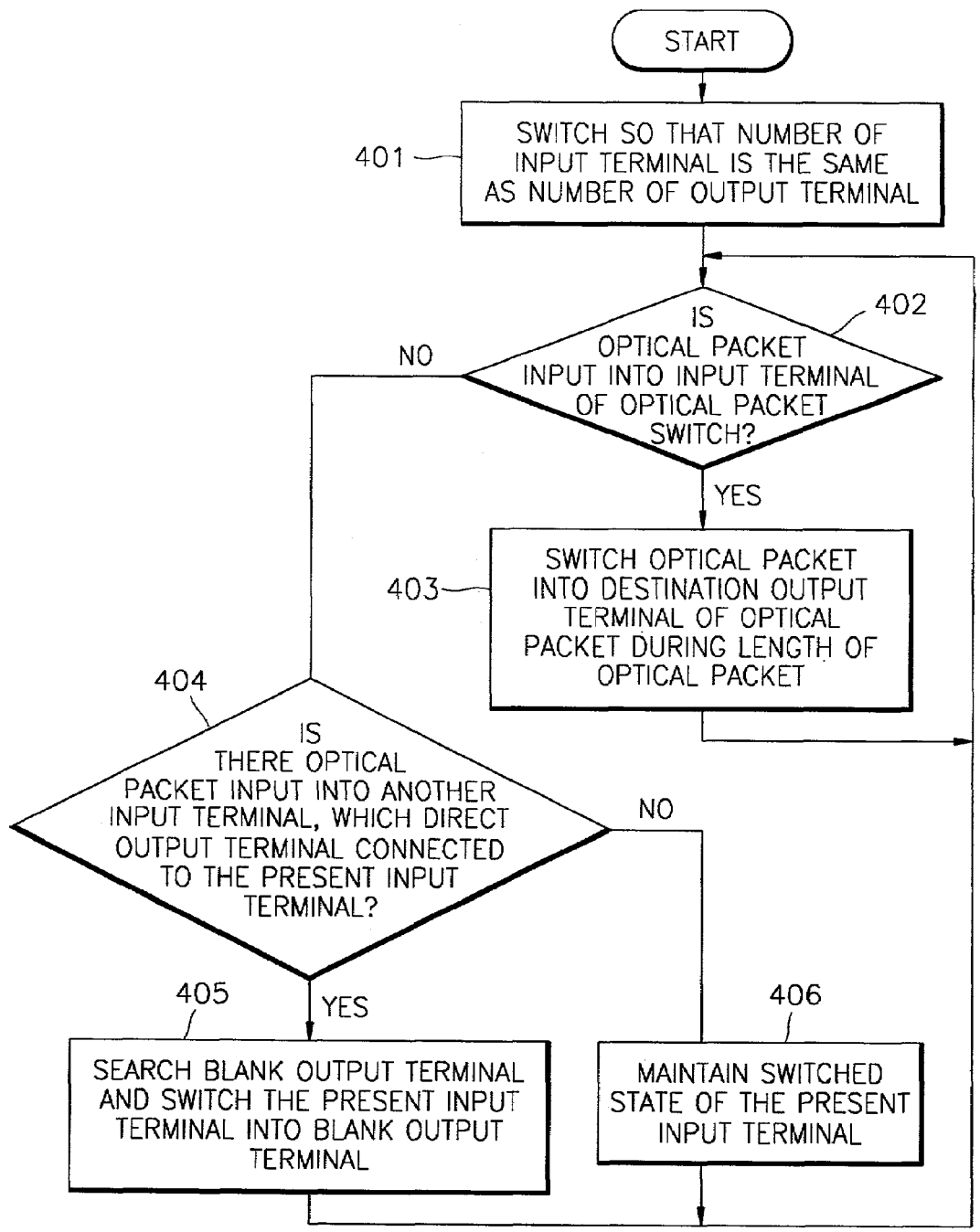
FIG. 4 is a flow chart illustrating a optical switching method according to the present invention.

FIG. 4 is a flow chart illustrating a method for controlling an input data of an optical switch according to the present invention. In step 401, the optical switch switches so that the number of an output terminal is the same as the number of an input terminal. In step 402, it is determined whether optical packets are inputted into the input terminals of the optical packet switch according to each channel, and in step 403, when an optical packet is inputted into an input terminal of the optical packet switch, the input data is switched to a destination output terminal of the optical packet during the length of the optical packet, and the optical switch proceeds to step 402. When an optical packet is not inputted into an input terminal (the present input terminal) of the optical packet switch in step 402, it is determined in step 404 whether there is an optical packet inputted into another input terminal, which direct the output terminal connected to the present input terminal. In step 405, when there is the optical packet, the input data is switched to the output terminal, a blank output terminal is searched, and the present input data is switched to the blank output terminal. In step 406, the switched state of the present input data is maintained when there is no optical packet which direct the output terminal connected to the present input data, input into another input terminal in step 404. After steps 405 and 406, the optical switch proceeds to step 405.

Figure 1:
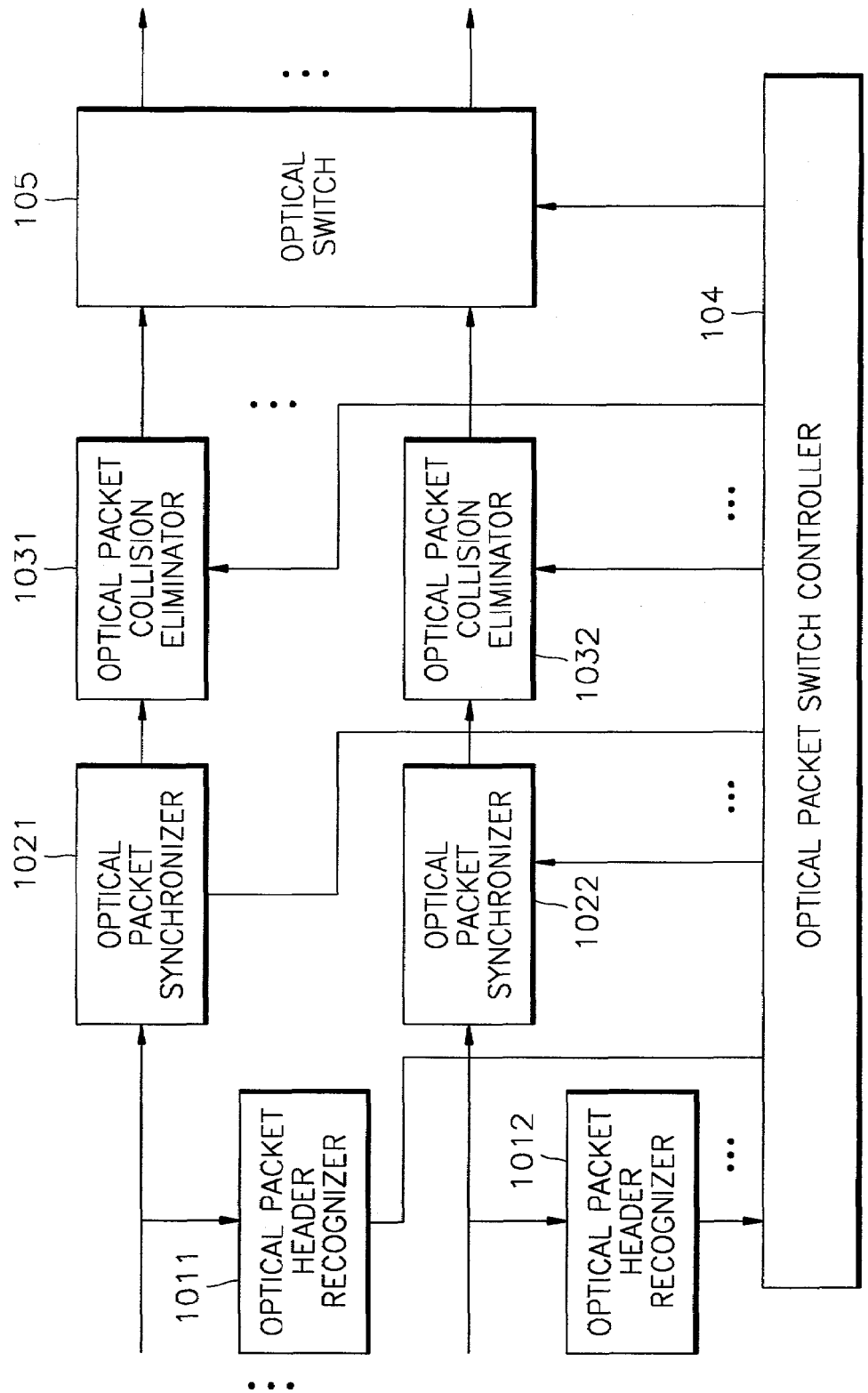
FIG. 1 is a conceptual diagram of a conventional optical packet switch.
Figure 2:
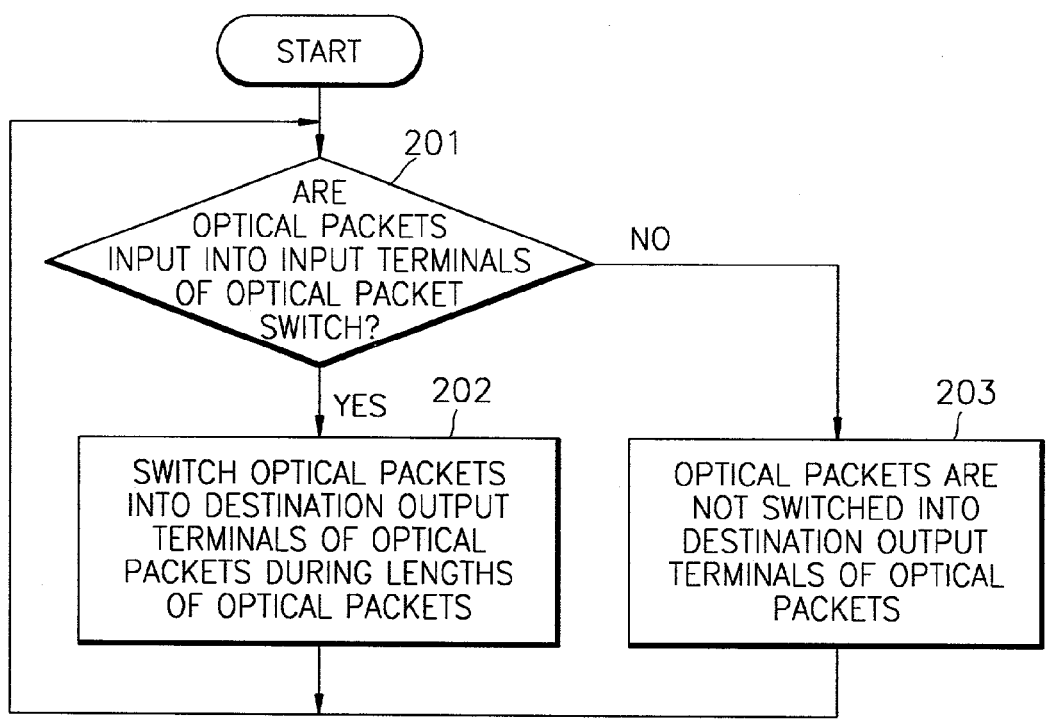
FIG. 2 is a flow chart illustrating a conventional optical switching method.
Figure 3:
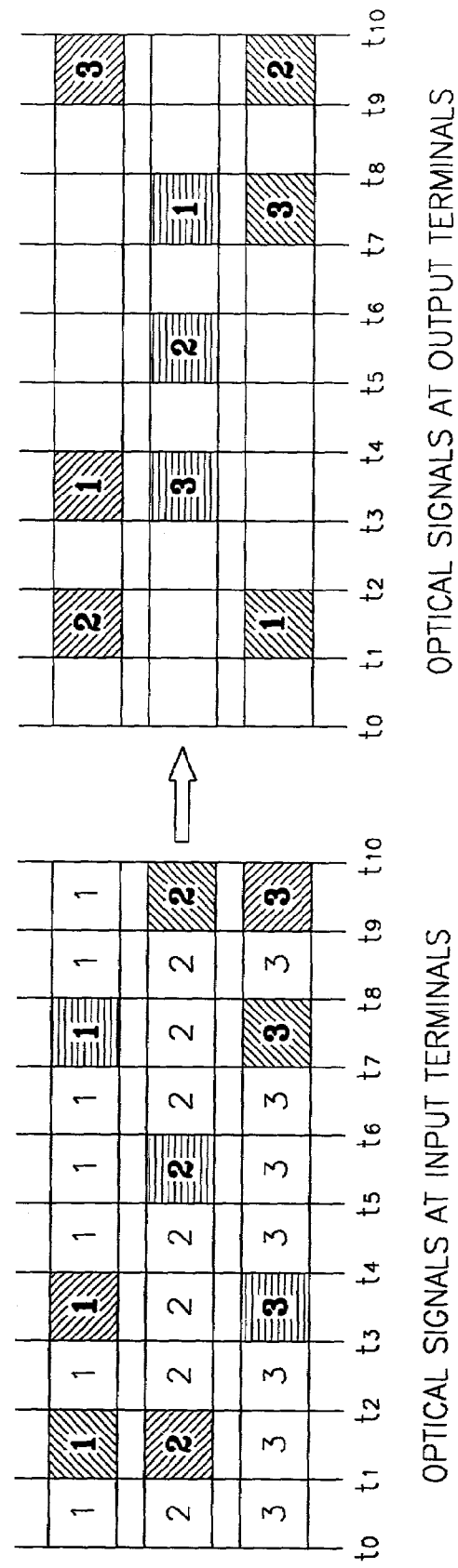
FIG. 3 illustrates examples of switching of continuous data according to the conventional optical switching method.
Figure 5:
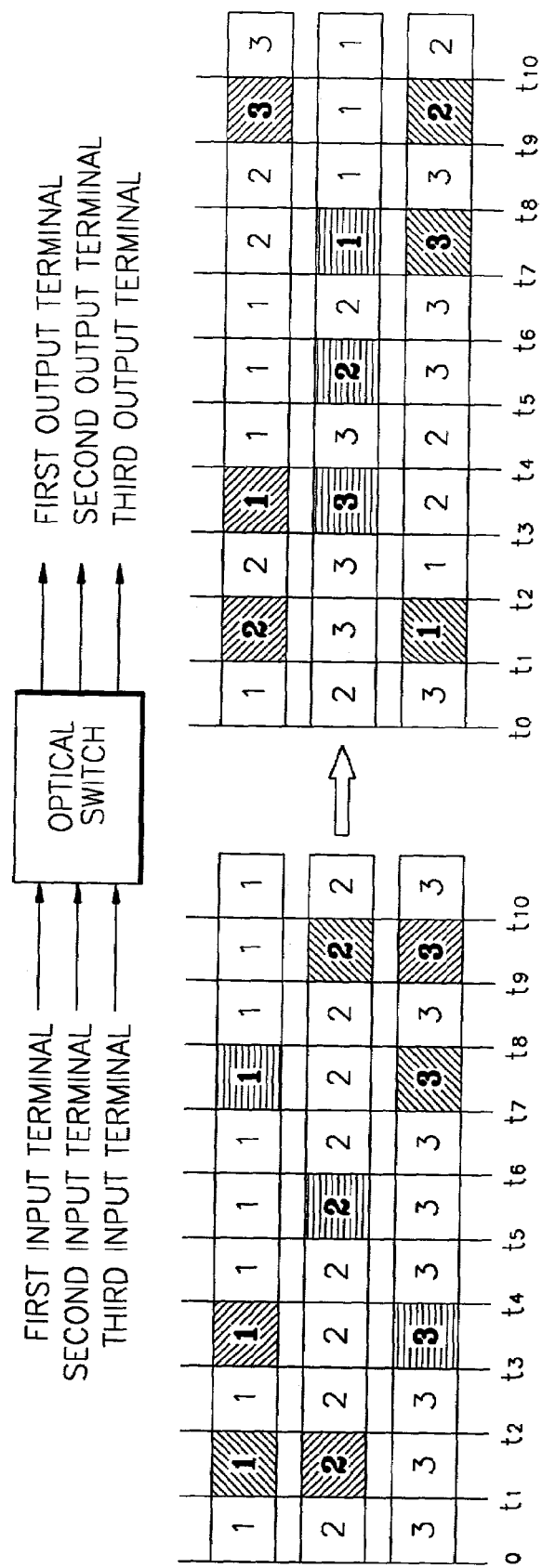
FIG. 5 illustrates a preferred embodiment of switching of continuous data according to the optical switching method.

FIG. 5 illustrates a preferred embodiment of switching of continuous data according to the optical switching method. As shown in FIG. 3, FIG. 5 illustrates examples of an optical switch, optical signals inputted into input terminals of the optical switch, and optical signals output to output terminals of the optical switch with time shown on the horizontal axis. Right oblique-lined packets among the optical signals at the input terminals direct a first output terminal, horizontal-lined packets direct a second output terminal, and left oblique-lined packets direct a third output terminal, and numbers in each packet represent the number of the input terminals. Blank data between the packets are arbitrary dummy data interposed between the packets and represent the number of the input terminals as figures.

At a time t0, initialization is performed, the dummy data are inputted into all input terminals, and thus the dummy data switched to the output terminal having the same number as the input terminal. At a time t1, the optical packets, which direct the third output terminal and the first output terminal, respectively, appears at a first input terminal and a second input terminal. Thus, the optical packets from the first input data and the second input data are switched to the third output terminal and the first output terminal, respectively, and the dummy data from the third input terminal is switched into the second output terminal, a blank output terminal.

At a time t2, the optical packets are terminated, and the dummy data are inputted again to all input terminals. Thus, the optical switch maintains the present switched state, the first, second, and third input data are switched to the third, first, and second output terminals, respectively. At a time t3, the optical packets, which direct the first output terminal and the second output terminal, respectively, appear at the first input terminal and the third input terminal. Thus, the first input data and the third input data are switched to the first output terminal and the second output terminal, respectively, and the second input data is switched into the third output terminal, a blank output terminal. In the following procedure, the optical packets and the dummy data are switched in the above manner.

Figure 6:
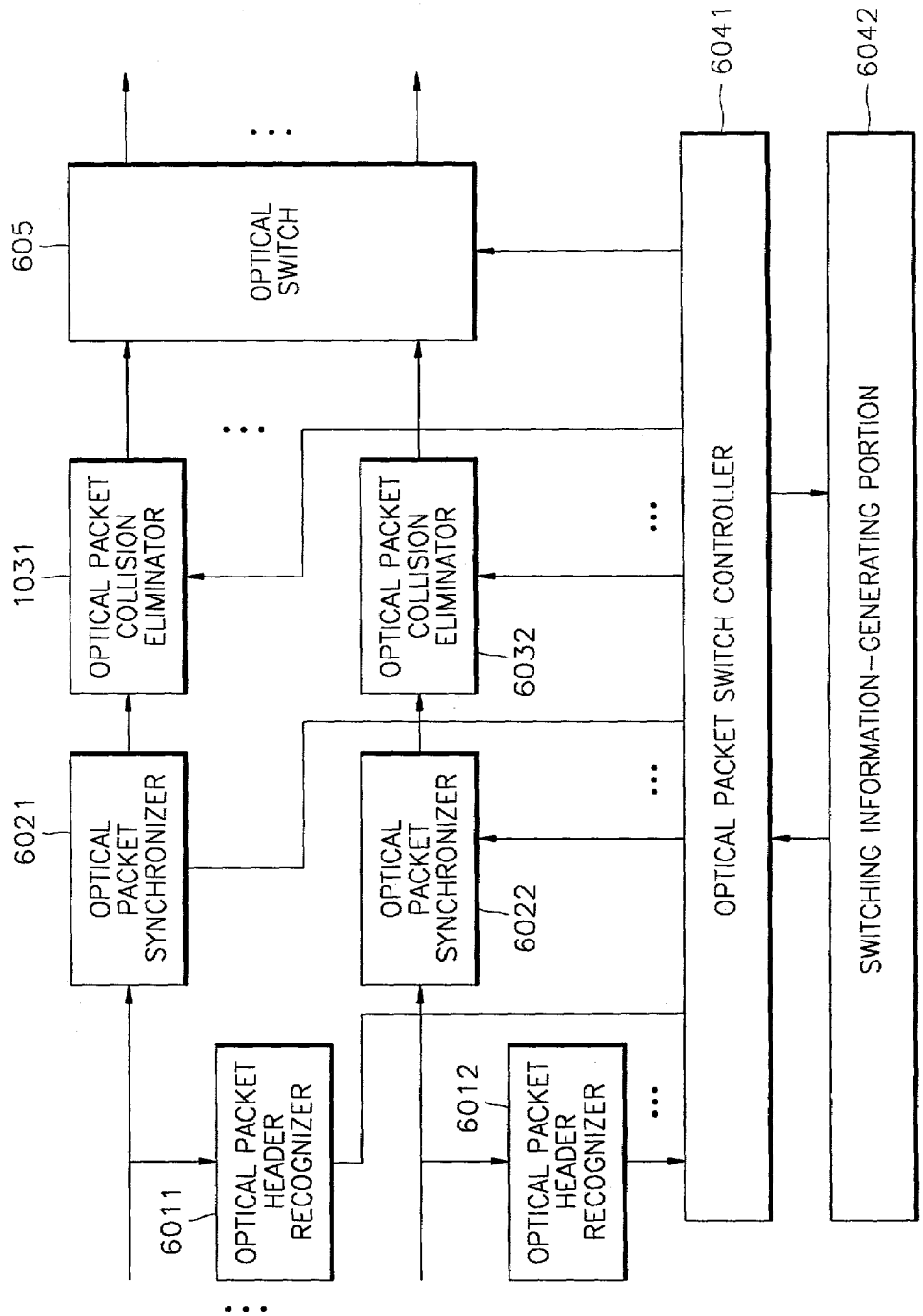
FIG. 6 illustrates a preferred embodiment of an optical switching system according to the present invention.

FIG. 6 illustrates a preferred embodiment of an optical switching system according to the present invention. In the preferred embodiment of the optical switching system, the optical packet switching system recognizes the header information of optical packets inputted into optical packet header recognizers 6011 and 6012 at each of the input terminals, extracts information related to output terminals of corresponding optical packets and packet synchronization information from the header information of the optical packets, and transmits the information to an optical packet switch controller 6041.

The optical packet switch controller 6041 synthesizes the information from the optical packet header recognizers 6011 and 6012 at each of the input terminals, gives commands to optical packet synchronizers 6021 and 6022, aligns input optical packets, and gives commands to optical packet collision eliminators 6031 and 6032. In a case where there are optical packets to be output to the same output terminal, the optical packet switch controller 6041 gives commands to optical packet collision eliminators 6031 and 6032, adjusts the optical packets so that the optical packets don't collide with one another by using a proper method, transmits information from the optical packet header recognizers 6011 and 6012 to an optical switching information-generating portion 6042, receives the switching information, and gives control commands to an optical switch 605 so that each of the optical signals is switched into a desired output terminal.

The optical switching information-generating portion 6042 generates switching information in which information related to output terminals of the optical packets inputted into each of input terminals is received from the optical packet switch controller 6042, input optical packets inputted into input terminals are switched to destination output terminals of the optical packets, blank output terminals are searched, and input data which are not optical packets are switched to the blank output terminals, and provides the switching information to the optical packet switch controller 6041.

The optical switch 605 may be one selected from a optical space switch, a wavelength switch, a optical time division switch, or a mixed type of more than two of the optical switches. That is, the optical switching method is not limited to the kind of an optical switch. Only, in the case of a optical space switch, an input terminal and an output terminal represent an input port and an output port of the optical space switch, represent an input wavelength and an output wavelength in the case of a wavelength switch, and represent an input time slot and an output time slot in the case of a optical time division switch.

The preferred embodiments of the present invention can be embodied in a computer program. The program can be realized in media used in a computer and in a common digital computer for operating the program. The program can be stored in computer readable media. The media can include magnetic media such as a floppy disk or a hard disk and optical media such as a CD-ROM or a digital video disc (DVD). Also, the program can be transmitted by carrier waves such as Internet.

According to the present invention, all input optical packets and dummy data can be switched into the output terminals without omission, and thus data output when input data have the shape of continuous data maintain the shape of the continuous data. Thus, the shape of continuous data can be used as physical data used in the optical packet switch. As a result, when continuous type data are switched and transmitted, in order to prevent data loss (when only the optical packets are switched and transmitted, there are no transmitted signals between the packets, and when optical signals are converted into electrical signals, all data are processed '0' in the absence of the signals, and in such a case, bit synchronization is lost, and then optical packets appear, and thus data can be lost when bit synchronization is reset even if normal data appear.) occurring when the optical signals are converted into electrical signals and processed, a traditional optical transmitter-receiver used in the present optical transmission, instead of a burst mode optical transmitter-receiver, which is required in a conventional optical packet switch but has the difficulty in implementation, can be used, and thus it becomes easy to implement the optical packet switch and costs can be reduced.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical switching method of an optical switch, the method comprising the steps of:
   (a) detecting a first input terminal of the optical switch into which a first optical packet is inputted, and switching the first optical packet to a first destination output terminal of the first optical packet; and
   (b) connecting a second destination terminal targeted by a second input terminal into which dummy data is inputted with a third input terminal being inputted a second optical packet, searching a blank destination terminal to switch the dummy data from the second input terminal to the blank destination terminal and outputting the dummy data from the blank destination terminal.

2. The method of claim 1, wherein a switching state of the second input terminal is maintained if the second destination terminal is not a destination of any optical packet, in step (b).

3. An optical switching system, the system comprising:
   an inputting portion for receiving optical signals through a plurality of input terminals;
   an optical packet switch controller for controlling an optical switch according to switching information;
   a switching information-generating portion for generating the switching information in which when an optical signal inputted into an input terminal among the plurality of input terminals is of an optical packet, the optical signal is switched to a destination output terminal according to information related to an output terminal of the optical signal, and when the optical signal is not of the optical packet, a blank output terminal is searched and the optical signal is switched to the blank output terminal to be outputted, and for providing the switching information to the optical packet switch controller; and
   an optical switch for switching the input optical signals from the inputting portion to output terminals according to control signals of the optical packet switch controller.

4. The system of claim 3, wherein the inputting portion comprises:
   an optical packet header recognizer for receiving the optical signals according to each channel, analyzing header information of optical packets contained in the optical signals, extracting information related to the output terminals of the optical packets and packet synchronization information from the header information, and transmitting the information to the optical packet switch controller;
   an optical packet synchronizer for synchronizing the optical packets in response to a command of the optical switch controller; and
   an optical packet collision eliminator for preventing collision of the optical packets to be output to a same output terminal in response to another command of the optical switch controller, and the optical packet switch controller synthesizes information transmitted from the optical packet header recognizer at each of input terminals and gives the commands to the optical packet synchronizer and the optical packet collision eliminator.

5. A computer readable recording medium in which a program executable by a computer is recorded, the program when executed by the computer causing the compute to:
   (a) detect a first input terminal of the optical switch into which a first optical packet is inputted, and switch the first optical packet to a first destination output terminal of the first optical packet; and
   (b) connect a second destination terminal targeted by a second input terminal into which dummy data is inputted with a third input terminal being inputted a second optical packet, search a blank destination terminal to switch the dummy data from the second input terminal to the blank destination terminal and output the dummy data from the blank destination terminal.

6. The computer readable recording medium of claim 5, wherein a switching state of the second input terminal is maintained if the second destination terminal is not a destination of any optical packet, in step (b).

* * * * *